US011475787B2

(12) United States Patent
Kamali-Sarvestani (10) Patent No.: US 11,475,787 B2
(45) Date of Patent: Oct. 18, 2022

(54) NANOTECHNOLOGY FABRICATION IN A VIRTUAL REALITY ENVIRONMENT

(71) Applicant: Utah Valley University, Orem, UT (US)

(72) Inventor: Reza Kamali-Sarvestani, Highland, UT (US)

(73) Assignee: Utah Valley University, Orem, UT (US)

( * ) Notice: Subject to any disclaimer, the term of this patent is extended or adjusted under 35 U.S.C. 154(b) by 1002 days.

(21) Appl. No.: 16/167,285

(22) Filed: Oct. 22, 2018

(65) Prior Publication Data

US 2019/0122576 A1 Apr. 25, 2019

Related U.S. Application Data (60) Provisional application No. 62/574,927, filed on Oct. 20, 2017.

(51) Int. Cl.
| | |
|---|---|
| *G09B 19/00* | (2006.01) |
| *A63F 13/798* | (2014.01) |
| *A63F 13/46* | (2014.01) |
| *G09B 5/06* | (2006.01) |

(52) U.S. Cl.
CPC .............. *G09B 19/00* (2013.01); *A63F 13/46* (2014.09); *A63F 13/798* (2014.09); *G09B 5/06* (2013.01)

(58) Field of Classification Search
CPC . G09B 19/00; G09B 5/06; A63F 13/46; A63F 13/798
See application file for complete search history.

(56) References Cited

U.S. PATENT DOCUMENTS

| | | | | |
|---|---|---|---|---|
| 9,536,026 | B2* | 1/2017 | Joshi | G06F 30/398 |
| 9,827,209 | B2* | 11/2017 | Kostamo | A61K 31/047 |
| 10,254,641 | B2* | 4/2019 | Mailfert | G06F 30/398 |
| 10,330,441 | B2* | 6/2019 | Cincotti | F41J 11/00 |
| 10,769,339 | B1* | 9/2020 | Wong | G06F 30/392 |
| 11,265,205 | B2* | 3/2022 | Umakanth | H04L 43/16 |
| 2002/0130844 | A1* | 9/2002 | Natoli | G06F 3/017 |
| | | | | 345/168 |
| 2007/0265725 | A1* | 11/2007 | Liu | G06F 30/00 |
| | | | | 700/121 |
| 2017/0004233 | A1* | 1/2017 | Han | G06F 30/398 |
| 2017/0200265 | A1* | 7/2017 | Bhaskar | G03F 1/86 |
| 2018/0165388 | A1* | 6/2018 | Liu | G03F 9/708 |
| 2018/0315926 | A1* | 11/2018 | Donoghue | H01L 27/3244 |
| 2018/0340252 | A1* | 11/2018 | Vazan | C23C 16/4583 |
| 2019/0035630 | A1* | 1/2019 | Lee | G03F 7/0002 |
| 2019/0227022 | A1* | 7/2019 | Harley-Trochimczyk | |
| | | | | A61B 5/01 |

(Continued)

*Primary Examiner* — Malina D. Blaise
(74) *Attorney, Agent, or Firm* — Kunzler Bean & Adamson (57) ABSTRACT

Apparatuses, methods, systems, and program products are disclosed for nanotechnology fabrication in a virtual reality environment. An apparatus includes a simulation module configured to generate a virtual reality environment for simulating a nanotechnology fabrication line. An apparatus includes a task module configured to provide one or more tasks associated with nanotechnology fabrication for a user to complete during a simulation within a virtual reality environment. An apparatus includes an assessment module configured to assess a user's performance while completing one or more tasks during a simulation within a virtual reality environment.

20 Claims, 5 Drawing Sheets

(56) References Cited

U.S. PATENT DOCUMENTS

| | | | |
|---|---|---|---|
| 2020/0299749 A1* | 9/2020 | Kwong | C12Q 1/37 |
| 2020/0387577 A1* | 12/2020 | Adolf | G06F 30/20 |
| 2021/0113653 A1* | 4/2021 | Pakyari | A61K 38/16 |
| 2022/0041684 A1* | 2/2022 | Patterson | C07K 14/705 |

\* cited by examiner

NANOTECHNOLOGY FABRICATION IN A VIRTUAL REALITY ENVIRONMENT

CROSS-REFERENCES TO RELATED APPLICATIONS

This application claims the benefit of U.S. Provisional Patent Application No. 62/574,927 entitled "VIRTUAL REALITY LEARNING PLATFORM" and filed on Oct. 20, 2017, for REZA KAMALI-SARVESTANI, which is incorporated herein by reference.

FIELD

This invention relates to nanotechnology fabrication and more particularly relates to simulating a nanotechnology fabrication line in a virtual reality environment.

BACKGROUND

Nanotechnology fabrication conventionally requires expensive machines and materials. Users that are learning how to fabricate materials using nanotechnology run the risk of damaging the expensive equipment or materials, which could be costly.

SUMMARY

An apparatus is presented for nanotechnology fabrication in a virtual reality environment. An apparatus, in one embodiment, includes a simulation module configured to generate a virtual reality environment for simulating a nanotechnology fabrication line. An apparatus, in certain embodiments, includes a task module configured to provide one or more tasks associated with nanotechnology fabrication for a user to complete during a simulation within a virtual reality environment. An apparatus, in further embodiments, includes an assessment module configured to assess a user's performance while completing one or more tasks during a simulation within a virtual reality environment.

A method is presented for nanotechnology fabrication in a virtual reality environment. A method, in one embodiment, includes generating a virtual reality environment for simulating a nanotechnology fabrication line. A method, in certain embodiments, includes providing one or more tasks associated with nanotechnology fabrication for a user to complete during a simulation within a virtual reality environment. A method, in further embodiments, includes assessing a user's performance while completing one or more tasks during a simulation within a virtual reality environment.

An apparatus is presented for nanotechnology fabrication in a virtual reality environment. An apparatus, in one embodiment, includes means for generating a virtual reality environment for simulating a nanotechnology fabrication line. An apparatus, in certain embodiments, includes means for providing one or more tasks associated with nanotechnology fabrication for a user to complete during a simulation within a virtual reality environment. An apparatus, in further embodiments, includes means for assessing a user's performance while completing one or more tasks during a simulation within a virtual reality environment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus is presented for nanotechnology fabrication in a virtual reality environment. An apparatus, in one embodiment, includes a simulation module configured to generate a virtual reality environment for simulating a nanotechnology fabrication line. An apparatus, in certain embodiments, includes a task module configured to provide one or more tasks associated with nanotechnology fabrication for a user to complete during a simulation within a virtual reality environment. An apparatus, in further embodiments, includes an assessment module configured to assess a user's performance while completing one or more tasks during a simulation within a virtual reality environment.

In one embodiment, the virtual reality environment comprises one or more rooms for simulating different parts of a nanotechnology fabrication line. Each room may be configured for the user to perform one or more tasks specific for the part of the nanotechnology fabrication line that the room simulates. In some embodiments, a room of the one or more rooms comprises a photolithography room for simulating one or more photolithography tasks associated with the nanotechnology fabrication line.

In certain embodiments, a room of the one or more rooms comprises a measurement room for simulating one or more measurement tasks associated with the nanotechnology fabrication line. In further embodiments, a room of the one or more rooms comprises an etching room for simulating one or more etching tasks associated with the nanotechnology fabrication line. In one embodiment, a room of the one or more rooms comprises a thin film composition room for simulating one or more thin film composition tasks associated with the nanotechnology fabrication line.

In various embodiments, the one or more rooms are accessible in a predefined order that corresponds to the nanotechnology fabrication line such that access to a subsequent room is prevented until the user completes one or more tasks of an instant room. In some embodiments, each of the one or more rooms comprises one or more virtual tools that the user can use to complete the one or more tasks for each room.

In one embodiment, the assessment module is configured to reward the user with points associated with correctly performing one or more steps towards completion of one or more tasks. In certain embodiments, the virtual reality environment is configured to host a plurality of users that collaboratively work together to complete the one or tasks during the simulation within the virtual reality environment.

In some embodiments, the virtual reality environment is hosted on a device located on a vehicle such that users access the virtual reality environment over a communication network using a remote client device. In certain embodiments, the user moves around the virtual reality environment by teleporting to different points of interest using different controls for the virtual reality environment without requiring the user to physically move.

A method is presented for nanotechnology fabrication in a virtual reality environment. A method, in one embodiment, includes generating a virtual reality environment for simulating a nanotechnology fabrication line. A method, in certain embodiments, includes providing one or more tasks associated with nanotechnology fabrication for a user to complete during a simulation within a virtual reality environment. A method, in further embodiments, includes assessing a user's performance while completing one or more tasks during a simulation within a virtual reality environment.

In one embodiment, the virtual reality environment comprises one or more rooms for simulating different parts of a nanotechnology fabrication line. Each room may be configured for the user to perform one or more tasks specific for the part of the nanotechnology fabrication line that the room simulates. In some embodiments, a room of the one or more rooms comprises a photolithography room for simulating one or more photolithography tasks associated with the nanotechnology fabrication line.

In certain embodiments, a room of the one or more rooms comprises a measurement room for simulating one or more measurement tasks associated with the nanotechnology fabrication line. In further embodiments, a room of the one or more rooms comprises an etching room for simulating one or more etching tasks associated with the nanotechnology fabrication line. In one embodiment, a room of the one or more rooms comprises a thin film composition room for simulating one or more thin film composition tasks associated with the nanotechnology fabrication line. In various embodiments, the one or more rooms are accessible in a predefined order that corresponds to the nanotechnology fabrication line such that access to a subsequent room is prevented until the user completes one or more tasks of an instant room.

An apparatus is presented for nanotechnology fabrication in a virtual reality environment. An apparatus, in one embodiment, includes means for generating a virtual reality environment for simulating a nanotechnology fabrication line. An apparatus, in certain embodiments, includes means for providing one or more tasks associated with nanotechnology fabrication for a user to complete during a simulation within a virtual reality environment. An apparatus, in further embodiments, includes means for assessing a user's performance while completing one or more tasks during a simulation within a virtual reality environment.

Figure 1:
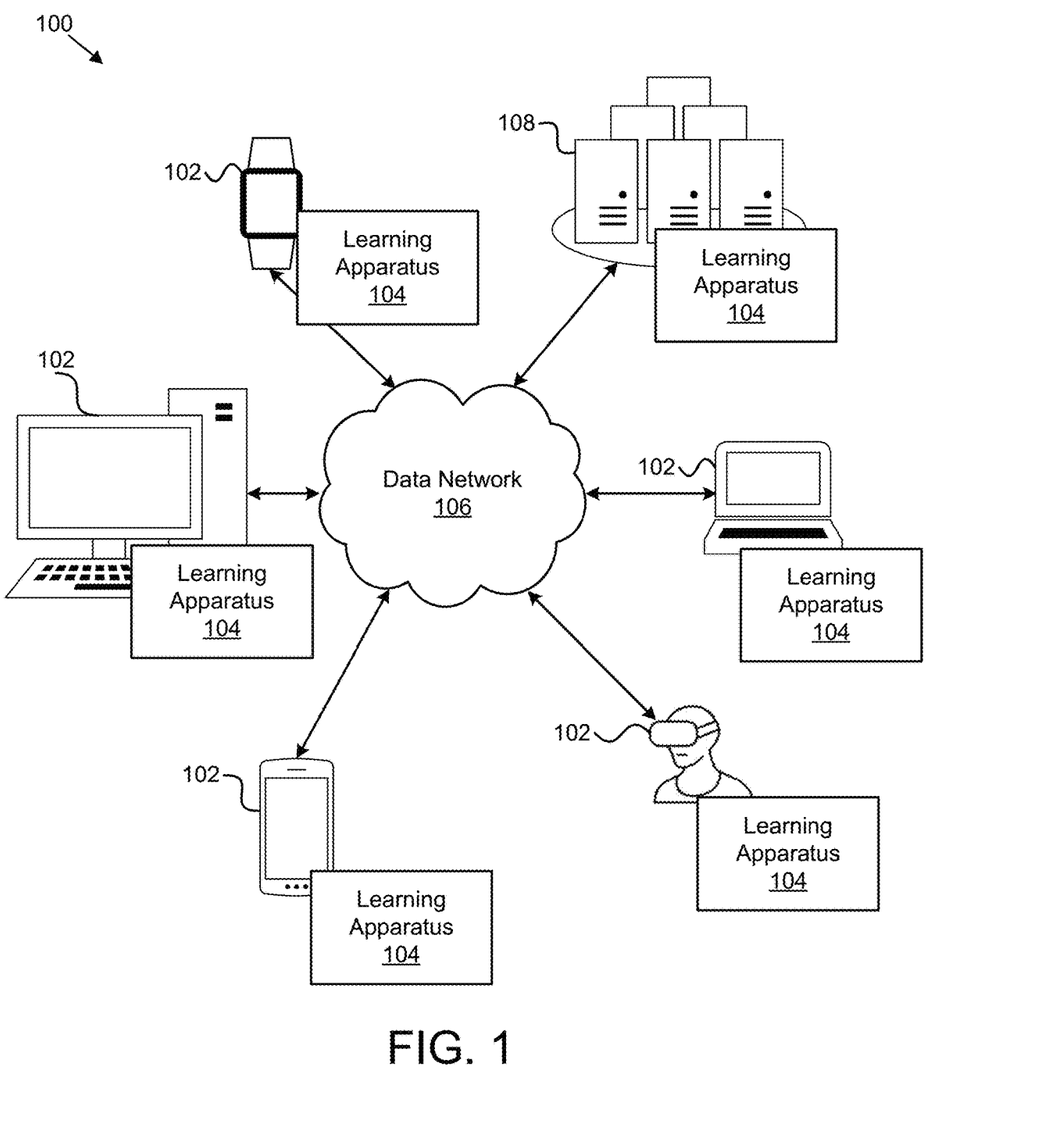
FIG. 1 is a schematic block diagram illustrating one embodiment of a system for nanotechnology fabrication in a virtual reality environment.

FIG. 1 is a schematic block diagram illustrating one embodiment of a system 100 for nanotechnology fabrication in a virtual reality environment. In one embodiment, the system 100 includes one or more information handling devices 102, one or more learning apparatuses 104, one or more data networks 106, and one or more servers 108. In certain embodiments, even though a specific number of information handling devices 102, learning apparatuses 104, data networks 106, and servers 108 are depicted in FIG. 1, one of skill in the art will recognize, in light of this disclosure, that any number of information handling devices 102, learning apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a virtual reality system (e.g., a virtual reality headset) a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like for providing a virtual reality learning environment, as described in more detail below.

For instance, the information handling devices 102 may include virtual reality hardware (or may be connected to virtual reality hardware) such as headsets or other displays, handsets or other hardware for providing touch-based interactivity, and/or the like such as HTC Vive® headset and controller system. As used herein, virtual reality may refer to an interactive computer-generated experience taking place within a simulated, three-dimensional environment, that incorporates mainly auditory and visual, but also other types of sensory feedback (e.g., haptic or force feedback). Virtual reality technology may use virtual reality headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, move around in it, and interact with virtual features or items. The effect is commonly created by virtual reality headsets consisting of a head-mounted display with a small screen in front of the eyes but can also be created through specially designed rooms with multiple large screens.

In one embodiment, the learning apparatus 104 is configured to generate and present a nanotechnology simulation in a virtual reality environment for simulating one or more steps, modules, functions, or the like of a nanotechnology fabrication line. A user may utilize various virtual technology hardware or equipment for viewing, navigating, and/or performing different tasks within the virtual reality environment. The learning module 104, in certain embodiments, is configured to provide one or more tasks associated with nanotechnology fabrication for a user to complete during the simulation within the virtual reality environment. In further embodiments, the learning module 104 is configured to assess the user's performance while completing the one or more tasks during the simulation within the virtual reality environment. The learning apparatus 104, including its various sub-modules, may be located on one or more information handling devices 102 in the system 100, one or more servers 108, one or more network devices, and/or the like.

In one embodiment, the learning apparatus 104 improves upon conventional methods for learning the nanotechnology fabrication process because users can experiment with tooling, objects, parts, and/or the like that resemble their real-world equivalents without fear of breaking expensive tools or parts. Thus, the learning apparatus 104 improves the technological process of teaching users about nanotechnology fabrication, which is an expensive, time-consuming endeavor that requires a steep learning curve to get to a point where a user has confidence to work within a nanotechnology fabrication setting.

The nanotechnology virtual environment can expedite the learning process, with minimal costs (because the virtual reality environment can run on commercial off-the-shelf components) by providing users with a "hands-on" learning experiences that mimics a real-world nanotechnology fabrication lab, and which would not be possible with the advanced computing and graphics technology that is required to generate the virtual reality nanotechnology fabrication environment. Various teaching, training, assessments, and/or the like may be created such as STEM education, carrier pathway training, and professional trainings. Even though the subject matter disclosed herein is directed to nanotechnology material fabrication, the subject matter may be applied to various manufacturing processes where virtual environments may be created for teaching and/or training users without spending money on and risking damage to real-world equipment.

In various embodiments, the learning apparatus 104 may be embodied as a hardware appliance that can be installed or deployed on an information handling device 102, on a server 108, or elsewhere on the data network 106. In certain embodiments, the learning apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the learning apparatus 104 may include a power interface, a wired and/or wireless network interface, a graphical interface that attaches to a display, and/or a semiconductor integrated circuit device as described below, configured to perform the functions described herein with regard to the learning apparatus 104.

The learning apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the learning apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the learning apparatus 104.

The semiconductor integrated circuit device or other hardware appliance of the learning apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the learning apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA®"). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The learning apparatus 104, or a portion of the learning apparatus 104, may be stored on the one or more servers 108, one or more information handling devices 102, and/or the like.

Figure 2:
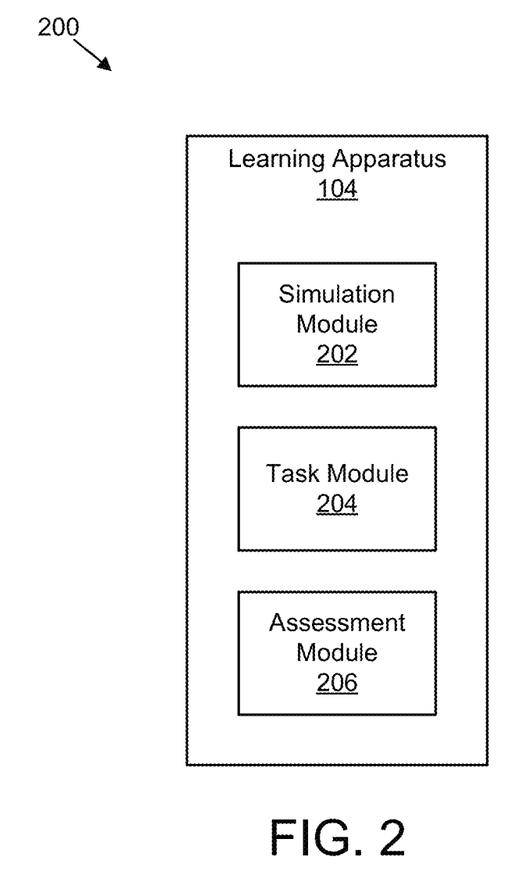
FIG. 2 is a schematic block diagram illustrating one embodiment of an apparatus for nanotechnology fabrication in a virtual reality environment.

FIG. 2 depicts one embodiment of an apparatus 200 for nanotechnology fabrication in a virtual reality environment. In one embodiment, the apparatus 200 includes an instance of a learning apparatus 104. The learning apparatus 104, in one embodiment, includes one or more of a simulation module 202, a task module 204, and an assessment module 206, which are described in more detail below.

The simulation module 202, in one embodiment, is configured to generate a virtual reality environment for simulating a nanotechnology fabrication line. As used herein, nanotechnology may refer to the science, engineering, and application of submicron matters (e.g., less than 100 nanometers) that tie together unique biological, physical, and chemical properties of nanoscale materials in essentially new and useful ways. Nanoscience involves the ability to see and control individual atoms and molecules. Applications may include surface sciences, organic chemistry, semiconductor physics, energy storage, microfabrication, and molecular engineering.

In certain embodiments, the simulation module 202 generates a virtual reality environment using various software packages, application, programs, functions, or the like such as the Virtual Reality Modeling Language, X3D, Autodesk Maya, Virtual Reality Toolkit, Substance Painter 2X, Unity, and/or the like. For instance, Autodesk Maya may be used to generate various 3D models for the virtual reality environment, and then exported to Unity, which may include the Virtual Reality Toolkit for generating and running scripts (e.g., using C#, Java, Python, or the like) to generate the virtual reality environment. The simulation module 202 may generate the virtual reality environment using graphics or video cards, central processing units or processor cores, and/or the like.

The simulation module 202, in one embodiment, generates a plurality of rooms, stations, or the like as part of the virtual environment for the nanotechnology fabrication line. Each room may be configured for performing different parts, portions, tasks, or the like of the nanotechnology fabrication line, including virtual representations of the tools, parts, or the like necessary for performing the tasks for the particular part of the nanotechnology fabrication line.

For instance, a room may include a photolithography room for simulating one or more photolithography tasks associated with the nanotechnology fabrication line. As used herein, photolithography (optical lithography or UV lithography) may refer to a process used in microfabrication to pattern parts of a thin film or the bulk of a substrate. It uses light to transfer a geometric pattern from a photomask to a light-sensitive chemical "photoresist", or simply "resist," on the substrate.

The simulation module 202 may provide virtual representations (e.g., 3D models) of the parts (wafer substrates) and tools required to perform different photolithography tasks such as cleaning chemicals and tools for cleaning a wafer surface, preparation tools such as heaters and other chemicals, photoresist application tools such as spin coating tools and chemicals, tools for exposing the wafer to light, and/or the like. In certain embodiments, the tools comprise interactive buttons, levers, dials, interfaces, and/or the like that resemble the real-world equivalents. For the spin-coating process, the simulation module 202 visually or graphically depicts liquid spreading on materials that the coating is applied to during the spinning process to visually resemble the real-world spin-coating process.

In another instance, a room may include a measurement room for simulating one or more measurement tasks associated with the nanotechnology fabrication line. For instance, the simulation module 202 may provide virtual representations of the parts (e.g., a wafer that has a photoresist application layer) and tools required to perform different measurements. For example, the simulation module 202 may provide virtual representations of tools for measuring thicknesses (e.g., of a photoresist layer of a wafer), lengths, widths, weights, and/or the like on a nanoscale.

In certain embodiments, a room may include an etching room for simulating one or more etching tasks associated with the nanotechnology fabrication line. As used herein, etching may be used in microfabrication to chemically remove layers from the surface of a wafer during manufacturing. For instance, in etching, a liquid ("wet") or plasma ("dry") chemical agent removes the uppermost layer of the substrate in the areas that are not protected by photoresist. In semiconductor fabrication, dry etching techniques are generally used, as they can be made anisotropic, in order to avoid significant undercutting of the photoresist pattern. Wet etch processes are generally isotropic in nature, which is often indispensable for microelectromechanical systems, where suspended structures must be "released" from the underlying layer.

Thus, for example, the simulation module 202 may generate virtual representations of tools and/or chemicals for different types of etching such as dry etching, wet etching including anisotropic wet etching, and/or the like. The particular etchant that is used may be based on the type of material that is to be etched. For example, aluminum material may be etched using a different combination of chemicals than silicon.

In further embodiments, a room may include a thin film composition room for simulating one or more thin film composition tasks associated with the nanotechnology fabrication line. As used herein, thin film composition may refer to the process of applying a thin film of material ranging from fractions of a nanometer (monolayer) to several micrometers in thickness.

For example, the simulation module 202 may generate virtual representations of tools, coatings, chemicals, and/or the like for applying a thin film on various items such as magnetic recording media, electronic semiconductor devices (wafers), optical coatings, and/or the like. The thin film may be used as protective coatings, electrically operating coatings, and/or the like.

The simulation module 202 may include other rooms that are part of the nanotechnology fabrication line such as a cleaning room for preparing the user to work on the items and tools in the nanotechnology fabrication line, a testing room for testing the manufactured nanotechnology item (e.g., silicon wafer), a sense of scale room, a material science structure room, an application of nanoparticles room, and/or the like. Room design, equipment, tools, layout, and/or the like may be user-defined, e.g., by an instructor or professional, and may be added and removed as needed.

In one embodiment, the task module 204 may be configured to provide one or more tasks associated with nanotechnology fabrication for a user to complete during the simulation within the virtual reality environment. For instance, the task module 204 may present different tasks for a user to complete within the one or more rooms of the virtual environment that the simulation module 202 presents. The tasks may be provided by a user, e.g., an instructor or professional during the simulation, prior to the simulation, and/or the like.

For example, the task module 204 may present a photolithography task, such as surface preparation and cleaning, hot plate, coating with positive/negative photoresist, baking, exposing, post baking, developing, agitation, applying a photoresist layer to a silicon wager, and/or the like within the photolithography room of the virtual environment. The tasks may include a series of steps that walks the user through the process of completing the task. The task module 204 may present the tasks/steps on a virtual whiteboard, a virtual notebook, a virtual tablet device, and/or the like within the virtual room.

Measurement tasks that the task module 204 presents in the measurement room may include scan electron microscopy, atomic force microscopy, tunneling electron microscopy, optical microscopy, energy dispersive analysis X (EDAX and XRD), Raman spectroscopy, profiling, measuring size, measuring weight, measuring temperature, and measuring time, and/or the like. Etching tasks may include wet etching and dry etching by plasma etcher, reactive ion etching (RIE), and inductive coupling etching for RIE, and/or the like. Thin film composition tasks may include using a thermal evaporator, sputtering, chemical vapor deposition CVD and PVD, and ion/molecular beam epitaxy (MBE), ion beam implantation, electro/electroless-plating, and/or the like.

In one embodiment, the task module 204 provides a tutorial for competing a task in response to the user struggling to complete the task or in response to determining that this is the first time the user has been in the room. For example, the first time that a user is in an etching room, the task module 204 may guide the user around the room to present the various tools, chemicals, items, objects, or the like within the room, and may present basic tasks that the user can do to perform different etching tasks or jobs.

In one embodiment, the assessment module 206 is configured to assess the user's performance while completing the one or more tasks during the simulation within the virtual reality environment. For instance, the assessment module 206 may give the user points, rewards, grades, or the like for correctly performing a task, or a step/job of a task, for correctly performing a task within a predetermined period of time, for selecting or using the correct tools or chemicals and in the correct order, and/or the like.

For example, the assessment module 206 may grade the various steps that the user takes to complete a simulated photolithography task while in the photolithography room within the virtual environment. The assessment module 206 may cross-reference the user's steps or actions with a checklist of steps that the user should take to complete the task and assigns a grade based on how many of the steps the user correctly performed.

In some embodiments, the simulation module 202 does not allow a user to move on to the next room if the assessment module 206 does not assign the user a threshold grade or score based on the user's performance in the current or instant room. In such an embodiment, the simulation module 202 may assign a predefined order to the rooms to mirror a real-world nanotechnology fabrication line. For example, the simulation module 202 may restrict access to the etching room until the user satisfactorily completes the tasks (e.g., receives a grade or score that is greater than or equal to a threshold score) in the photolithography room.

In one embodiment, multiple users may simultaneously, in real-time and collaboratively access the virtual reality environment, e.g., from various networked devices, to work together on one or more tasks within a room of the virtual nanotechnology fabrication line. For example, users may be divided into teams, e.g., for a school project or assignment, and may have to work together within the photolithography room to complete one or more photolithography tasks. In such an embodiment, the assessment module 206 grades the users together as a team to determine whether the users completed the tasks within a predetermined amount of time, whether each user participated, what actions each user took and whether the actions were correct, and/or the like.

In such an embodiment, the simulation module 202 may be hosted or located on a central server, device, or the like that is located locally or remotely to one or more users. For instance, the simulation module 202 may generate and present the virtual environment on a user's device such as a smart phone. In one example, the simulation module 202 may be located on a cloud device to generate a virtual environment that a plurality of remote clients can connect to and access over a network connection. In another example embodiment, the simulation module 202 may be located on a local server, e.g., on an intranet, that multiple different remote clients can connect to and access using the local data network.

In an example scenario, the learning apparatus 104 may be located on a vehicle such as a bus, a train, an airplane, or the like such that users on the vehicle can use their local devices, e.g., smart phone, to connect to the simulation module 202 and access the virtual environment to learn the nanotechnology fabrication line while traveling.

In such an embodiment, the simulation module 202 provides a way for the users to navigate or move through the virtual environment without requiring the users to physically move, e.g., physically walk. For example, the simulation module 202 may allow users to teleport (e.g., zoom to points within the virtual environment) through the virtual rooms of the nanotechnology fabrication line based on different points of interest or destination points (e.g., such as tools, doors, stations, or the like within the room) within the virtual environment using different controls on the virtual reality hardware (e.g., different buttons, joysticks, or the like).

In one embodiment, if the assessment module 206 determines that a user performed a step incorrectly, e.g., created an incorrect sample, the simulation module 202 allows the user to undo steps, go back a certain number of steps, go back to a checkpoint, or the like to try again from that point and fix the errors. Furthermore, the simulation module 202 may visually or graphically simulate the consequences of certain errors such as explosions, fires, and/or other dangers or hazards with the virtual reality environment.

In some embodiments, the tasks that the task module 204 presents are part of a game or a gamification of a project within the virtual environment such that the assessment module 206 provides points, rewards, awards, leaderboards, and/or the like so that users can compete against each other to further facilitate learning within the virtual nanotechnology fabrication lab.

Figure 3:
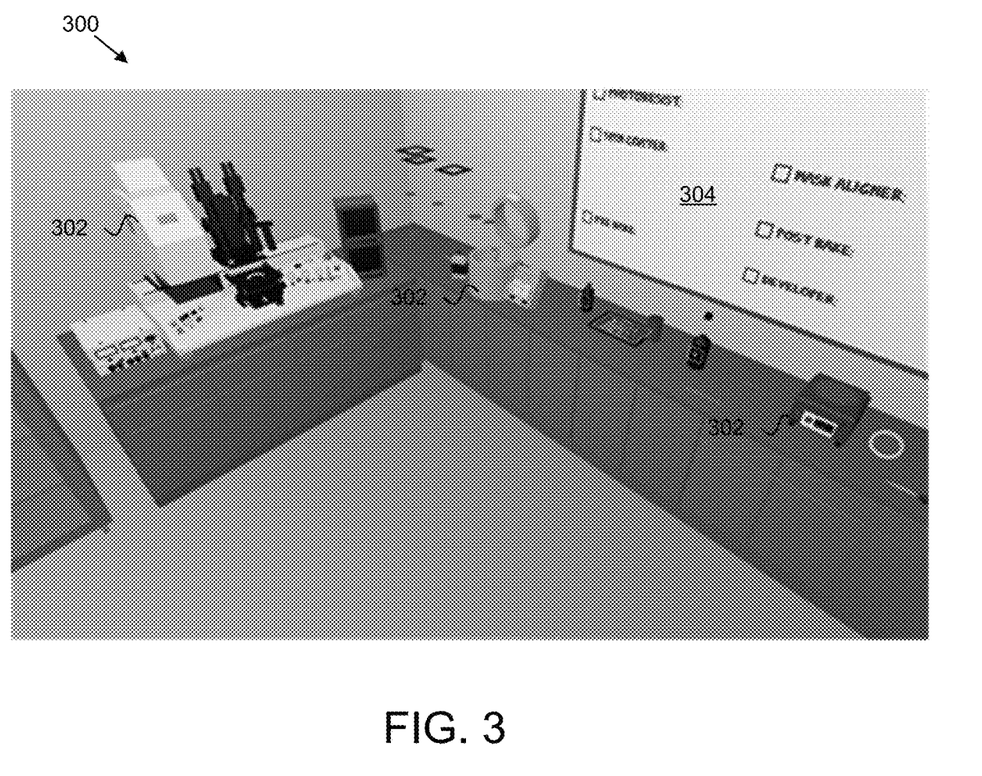
FIG. 3 is an embodiment of a virtual reality environment for nanotechnology fabrication in a virtual reality environment.

FIG. 3 is an embodiment of a virtual reality environment 300 for nanotechnology fabrication in a virtual reality environment. The virtual reality environment 300 may be an example embodiment of a virtual reality room for a nanotechnology fabrication line such as a photolithography room, a measurement room, an etching room, a thin film composition room, and/or the like that the simulation module 202 generates.

The virtual reality room may include various tools 302 such as a scanning electron microscope, an atomic force microscope, or the like. The task module 204, in one embodiment, for example, may present one or more tasks for teaching a user how to use a scanning electron microscope within the virtual reality room so that the user does not have to learn on expensive equipment in the real world. In such an embodiment, the task module 204 may present the tasks on a virtual whiteboard 304 within the room. The assessment module 206 may further track the user's progress through the task and provide a score for the user according to the user's progress.

The simulation module 202 may allow a user to navigate through the room using destination points, e.g., points at the different tools 302, at the whiteboard 304, or the like, instead of requiring the user to physically move as if the user is moving through the room. The simulation module 202 may generate models for the tools 302 that resemble the real-world equivalents and that include interactive buttons, interfaces, dials, levers, and/or the like so that the user gains a real-world experience with the tools 302 within a virtual environment.

Figure 4:
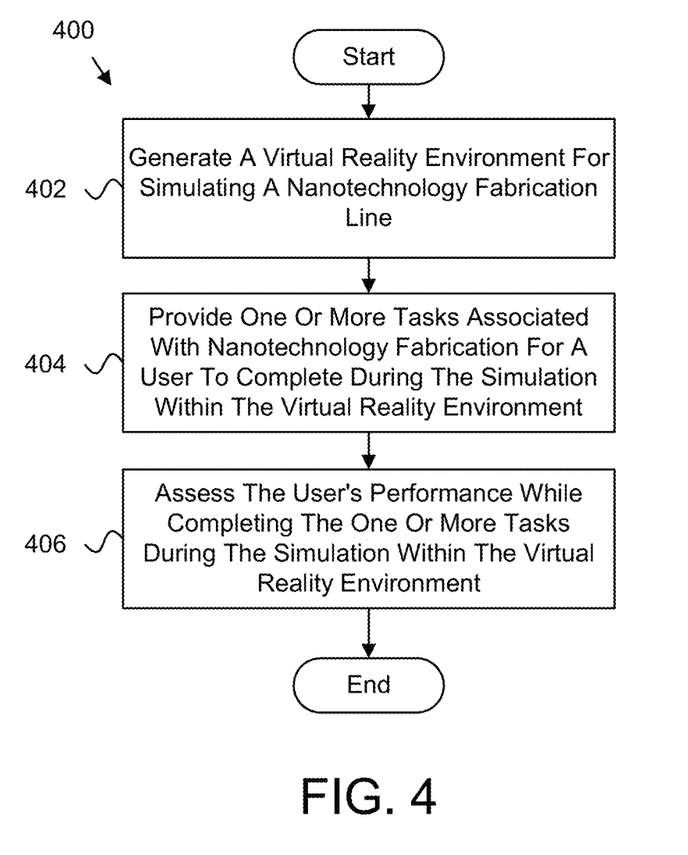
FIG. 4 is a schematic flow chart diagram illustrating one embodiment of a method for nanotechnology fabrication in a virtual reality environment.

FIG. 4 is a schematic flow chart diagram illustrating one embodiment of a method 400 for nanotechnology fabrication in a virtual reality environment. In one embodiment, the method 400 begins and the simulation module 202 generates 402 a virtual reality environment for simulating a nanotechnology fabrication line. In further embodiments, the task module 204 provides 404 one or more tasks associated with nanotechnology fabrication for a user to complete during the simulation within the virtual reality environment. In certain embodiments, the assessment module 206 assesses 406 the user's performance while completing the one or more tasks during the simulation within the virtual reality environment, and the method 400 ends.

Figure 5:
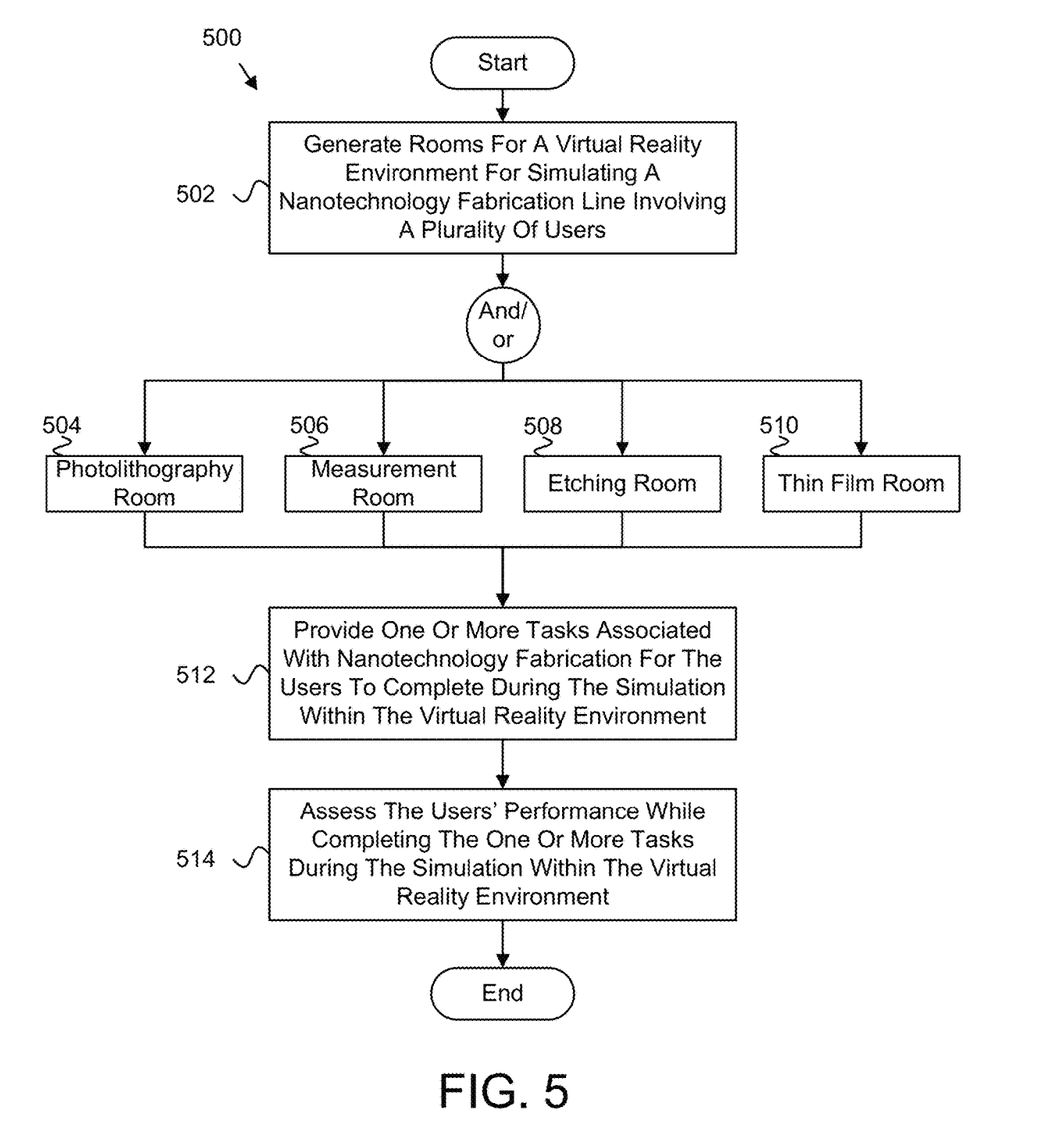
FIG. 5 is a schematic flow chart diagram illustrating one embodiment of a method for nanotechnology fabrication in a virtual reality environment.

FIG. 5 is a schematic flow chart diagram illustrating one embodiment of a method 500 for nanotechnology fabrication in a virtual reality environment. In one embodiment, the method 500 begins and a simulation module 202 generates 502 a virtual reality environment for simulating a nanotechnology fabrication line involving a plurality of users. For instance, a plurality of users may access the virtual reality environment to work together or collaboratively to complete a task within various rooms of the virtual reality environment.

For instance, the rooms may include a photolithography room 504, a measurement room 506, an etching room 5080, and/or a thin film composition room 510. The task module 204, in certain embodiments, provides 512 one or more tasks associated with nanotechnology fabrication for the users to complete during the simulation within the virtual reality environment.

In further embodiments, the assessment module 206 assesses 514 the users' performance while completing the one or more tasks during the simulation within the virtual reality environment, and the method 500 ends.

A means for generating a virtual reality environment for simulating a nanotechnology fabrication line, in various embodiments, may include one or more of an information handling device 102, a server 108, a simulation module 202, a learning apparatus 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for generating a virtual reality environment for simulating a nanotechnology fabrication line.

A means for providing one or more tasks associated with nanotechnology fabrication for a user to complete during the simulation within the virtual reality environment, may include one or more of an information handling device 102, a server 108, a task module 204, a learning apparatus 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for generating a virtual reality environment for simulating a nanotechnology fabrication line.

A means for assessing the user's performance while completing the one or more tasks during the simulation within the virtual reality environment, in various embodiments, may include one or more of an information handling device 102, a server 108, an assessment module 206, a learning apparatus 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for assessing the user's performance while completing the one or more tasks during the simulation within the virtual reality environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a simulation module configured to generate, by a processor, a virtual reality environment for simulating a nanotechnology fabrication line for presentation on an electronic display, the virtual reality environment comprising one or more rooms for simulating different parts of the nanotechnology fabrication line, each room comprising a plurality of virtual parts and tools that a user interacts with using virtual reality handsets that provide touch-based interactivity and sensory feedback;
a task module configured to provide, by the processor, one or more tasks associated with nanotechnology fabrication for a user to complete, by interacting with the plurality of virtual parts and tools using virtual reality handsets, during the simulation within each room of the virtual reality environment; and
an assessment module configured to assess, by the processor, the user's performance while completing the one or more tasks during the simulation within the virtual reality environment.

2. The apparatus of claim 1, wherein each room is configured for the user to perform one or more tasks specific for the part of the nanotechnology fabrication line that the room simulates.

3. The apparatus of claim 2, wherein a room of the one or more rooms comprises a photolithography room for simulating one or more photolithography tasks associated with the nanotechnology fabrication line.

4. The apparatus of claim 2, wherein a room of the one or more rooms comprises a measurement room for simulating one or more measurement tasks associated with the nanotechnology fabrication line.

5. The apparatus of claim 2, wherein a room of the one or more rooms comprises an etching room for simulating one or more etching tasks associated with the nanotechnology fabrication line.

6. The apparatus of claim 2, wherein a room of the one or more rooms comprises a thin film composition room for simulating one or more thin film composition tasks associated with the nanotechnology fabrication line.

7. The apparatus of claim 2, wherein the one or more rooms are accessible in a predefined order that corresponds to the nanotechnology fabrication line such that access to a subsequent room is prevented until the user completes one or more tasks of an instant room.

8. The apparatus of claim 2, wherein each of the one or more rooms comprises one or more virtual tools that the user can use to complete the one or more tasks for each room.

9. The apparatus of claim 1, wherein the assessment module is configured to reward the user with points associated with correctly performing one or more steps towards completion of one or more tasks.

10. The apparatus of claim 1, wherein the virtual reality environment is configured to host a plurality of users that collaboratively work together to complete the one or tasks during the simulation within the virtual reality environment.

11. The apparatus of claim 1, wherein the virtual reality environment is hosted on a device located on a vehicle such that users access the virtual reality environment over a communication network using a remote client device.

12. The apparatus of claim 11, wherein the user moves around the virtual reality environment by teleporting to different points of interest using different controls for the virtual reality environment without requiring the user to physically move.

13. A method, comprising:
generating, by a processor, a virtual reality environment for simulating a nanotechnology fabrication line for presentation on an electronic display, the virtual reality environment comprising one or more rooms for simulating different parts of the nanotechnology fabrication line, each room comprising a plurality of virtual parts and tools that a user interacts with using virtual reality handsets that provide touch-based interactivity and sensory feedback;
providing, by the processor, one or more tasks associated with nanotechnology fabrication for a user to complete, by interacting with the plurality of virtual parts and tools using virtual reality handsets, during the simulation within each room of the virtual reality environment; and
assessing, by the processor, the user's performance while completing the one or more tasks during the simulation within the virtual reality environment.

14. The method of claim 13, wherein each room is configured for the user to perform one or more tasks specific for the part of the nanotechnology fabrication line that the room simulates.

15. The method of claim 14, wherein a room of the one or more rooms comprises a photolithography room for simulating one or more photolithography tasks associated with the nanotechnology fabrication line.

16. The method of claim 14, wherein a room of the one or more rooms comprises a measurement room for simulating one or more measurement tasks associated with the nanotechnology fabrication line.

17. The method of claim 14, wherein a room of the one or more rooms comprises an etching room for simulating one or more etching tasks associated with the nanotechnology fabrication line.

18. The method of claim 14, wherein a room of the one or more rooms comprises a thin film composition room for simulating one or more thin film composition tasks associated with the nanotechnology fabrication line.

19. The method of claim 14, wherein the one or more rooms are accessible in a predefined order that corresponds to the nanotechnology fabrication line such that access to a subsequent room is prevented until the user completes one or more tasks of an instant room.

20. An apparatus, comprising:
  means for generating, by a processor, a virtual reality environment for simulating a nanotechnology fabrication line for presentation on an electronic display, the virtual reality environment comprising one or more rooms for simulating different parts of the nanotechnology fabrication line, each room comprising a plurality of virtual parts and tools that a user interacts with using virtual reality handsets that provide touch-based interactivity and sensory feedback;
  means for providing, by the processor, one or more tasks associated with nanotechnology fabrication for a user to complete, by interacting with the plurality of virtual parts and tools using virtual reality handsets, during the simulation within each room of the virtual reality environment; and
  means for assessing, by the processor, the user's performance while completing the one or more tasks during the simulation within the virtual reality environment.

* * * * *